United States Patent [19]

Kobayashi et al.

[11] Patent Number: 5,167,303

[45] Date of Patent: Dec. 1, 1992

[54] DISC BRAKE

[75] Inventors: Kinzo Kobayashi, Kanagawa; Shinji Suzuki, Yamanashi, both of Japan

[73] Assignee: Tokico Ltd., Kanagawa, Japan

[21] Appl. No.: 688,423

[22] Filed: Apr. 22, 1991

[30] Foreign Application Priority Data

Apr. 20, 1990 [JP] Japan ................... 2-104809

[51] Int. Cl.$^5$ .............................................. F16D 55/00
[52] U.S. Cl. ................................... 188/71.1; 188/370
[58] Field of Search ................ 188/71.4, 71.5, 72.1, 188/72.3, 72.4, 72.9, 370, 250 R, 73.44, 73.45

[56] References Cited

U.S. PATENT DOCUMENTS

| | | | |
|---|---|---|---|
| 3,482,655 | 12/1969 | Walther | 188/72.4 |
| 3,734,248 | 5/1973 | Fay | 188/72.4 X |
| 3,889,785 | 6/1975 | Hori | 188/72.4 X |
| 4,042,072 | 8/1977 | Baba | 188/72.4 X |
| 4,596,317 | 6/1986 | Nagai et al. | 188/72.4 |
| 4,844,206 | 7/1989 | Casey | 188/73.1 X |

Primary Examiner—Robert J. Oberleitner
Assistant Examiner—Lee W. Young
Attorney, Agent, or Firm—Wenderoth, Lind & Ponack

[57] ABSTRACT

A disc brake for use in a vehicle, such as an automobile, includes a carrier, a rotating disc having inner and outer braking surfaces, inner and outer pads, and a caliper supported in a floating condition by the carrier. The caliper has a cylinder member housing a piston for forcing the inner pad against the inner braking surface of the disc, and a claw member having a disc-passing portion straddling the disc and a claw portion for abutting against the outer pad. The cylinder member defines a through-hole extending therethrough in the axial direction of the disc. The disc-passing portion has an inner surface facing the disc and a tapped hole. A bolt member of the caliper secures the cylinder and claw members together. The tapped portion of the tapped hole is formed such that the end of the tapped portion which is remote from the cylinder member is located on the side of the cylinder member with respect to the inner braking surface. The disc-passing portion is provided with a raised portion forming a protrusion at the inner surface thereof. The protrusion extends a predetermined inward distance, with respect to the radial direction of the disc, and extends in the axial direction of the hole to the extent over which the tapped portion is formed.

2 Claims, 3 Drawing Sheets

DISC BRAKE

BACKGROUND OF THE INVENTION

1. Field of the Invention

The present invention relates to a disc brake for use in a vehicle such as an automobile.

2. Prior Art

There has recently arisen a pronounced desire for an improvement in a rate of fuel consumption of automobiles. Various measures have been attempted to improve the rate of fuel consumption. One of them is to improve power-supply system performance by improving engine performance. Another is to reduce running-resistance through improvements in the design of vehicle bodies. It is also known that reducing resistance to acceleration when accelerating a car greatly contributes to an improvement in the rate of fuel consumption. There have also been various attempts to reduce the weight of vehicles which has a direct influence on the rate of fuel consumption.

Reducing the weight of a disc brake which is provided on a car has been attempted as one measure for reducing the weight of a vehicle. This attempt relates to a caliper which comprises one part of a floating type of disc brake. The caliper comprises a cylinder member having a cylinder bore formed therein for receiving a piston for forcing an inner pad onto a disc, and a claw member having a disc-passing portion straddling the disc and a claw portion for abutting an outer pad to force it onto the disc. The cylinder member is provided with through-holes extending in the axial direction of the disc while corresponding tapped holes are formed in the disc-passing portion of the claw member. Respective bolts are inserted through the through-holes and are threaded into the tapped holes to fixedly secure the cylinder member and claw member to each other. Although the claw member is made of iron, the cylinder member is made of a light alloy such as an aluminum alloy, thereby reducing the weight of the caliper. It is necessary for the claw member to be made of iron in order for it to be highly rigid in order to withstand substantial forces. Namely, a very great force acts on the claw member when the brake is actuated and the claw portion is forcing the outer pad onto the disc. There is also a requirement for the disc-passing portion to be formed with a thickness not exceeding a certain value which is determined from the design requirements, since the disc-passing portion is located within a narrow area of clearance between the disc and the wheel associated therewith. Consequently, the claw member is made of iron which, although relatively thin, is highly rigid.

However, the conventional caliper mentioned above suffers from the following problems.

When the caliper is actuated to force the pads onto the disc, a great lateral force acts on the bolts securing the cylinder member and claw member to each other, and distorts respective portions of the two members engaged with each other as well as the bolts. If bolts with a larger diameter are employed to connect the cylinder member and claw member in order to provide for stronger securement of the two members so as to prevent distortion of the associated members, the disc-passing portion of the claw member must be made thicker, thus causing the disc to be smaller in diameter. This disc with a reduced diameter leads to a deterioration in braking performance. The disc with a reduced diameter does not have a sufficient heat capacity, either. When smaller diameter bolts are employed in order to avoid causing the diameter of the disc to be made smaller while attaining sufficient strength of the securing means, the number of bolts must be increased. This leads to an increase in both the number of parts of the disc brake and the number of steps required for its assembly, resulting in high production costs.

SUMMARY OF THE INVENTION

In view of the foregoing, it is the main object of this invention to provide a disc brake comprising a fist type of caliper provided with a connecting arrangement having high rigidity for connecting a cylinder member and a claw member, which connecting arrangement does not require any increase in the number of parts as compared to the conventional disc brake.

To achieve this object, the present invention provides a disc brake for use in a vehicle such as an automobile, the disc brake comprising: a carrier fixedly secured to a non-rotatable portion of the body of a vehicle; a rotating disc having inner and outer braking surfaces; inner and outer pads respectively disposed on opposite sides of the disc, the inner and outer pads being slideably supported in the axial direction of the disc and adapted to be engageable with the inner and outer braking surfaces of the disc, respectively; and a caliper supported in a floating condition by means of the carrier, the caliper including a cylinder member housing therein a piston for forcing the inner pad onto the inner braking surface of the disc, a claw member having a disc-passing portion straddling the disc and pads and a claw portion for abutting against the outer pad to force it onto the outer braking surface of the disc, the cylinder member having a through-hole extending therethrough in the axial direction of the disc, the disc-passing portion of the claw member being provided with an inner surface facing the disc and pads and with a hole extending therein in the axial direction of the disc and having a female-tapped portion, and a bolt member extending through the through-hole of said cylinder member and threaded into the female-tapped portion of the hole of the disc-passing portion to fixedly secure said cylinder member and claw member to each other. The tapped portion is formed such that the end of the tapped portion which is remote from the cylinder member is located on the side of the cylinder member with respect to the inner braking surface. The disc-passing portion is provided with a raised portion forming a protrusion at the inner surface thereof, the raised portion thus protruding a predetermined distance at the inner surface and extending in the axial direction of the hole and within an area in which the tapped portion is formed.

The above and other related objects and features of the invention will become apparent from the following description of the disclosure found in the accompanying drawings and the novelty pointed out in the appended claims.

DETAILED DESCRIPTION OF THE INVENTION

Figure 1:
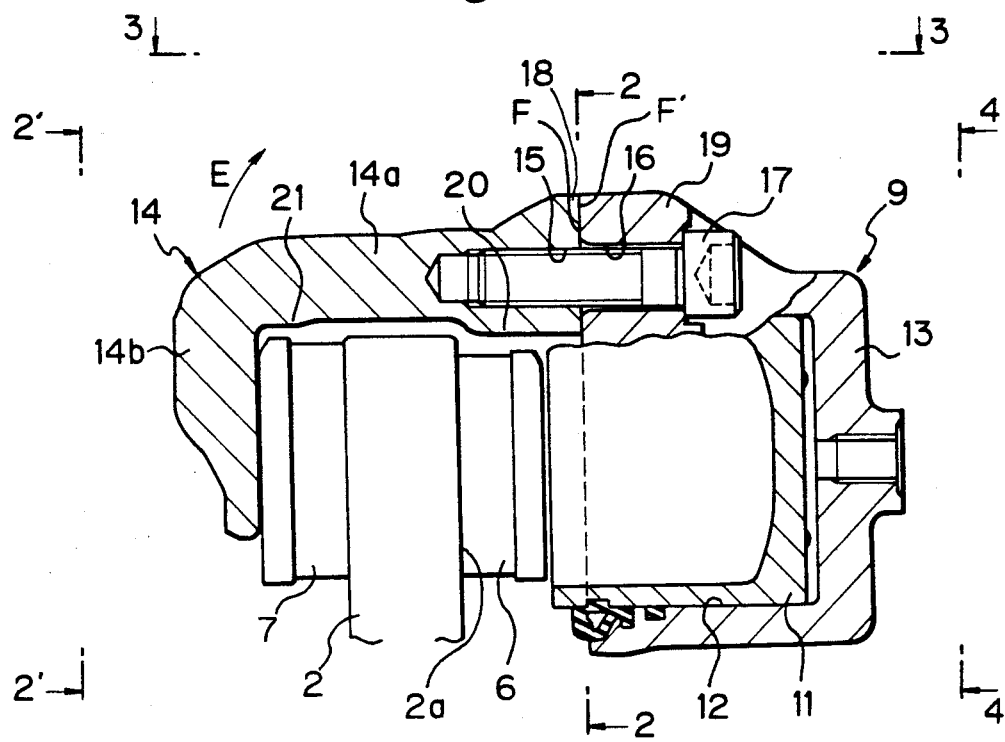
FIG. 1 is a sectional view taken along line 1—1 in FIG. 4 of a first embodiment of a disc brake according to the present invention.

Referring to the figures, a preferred embodiment of the invention will be explained.

Reference numeral 1 designates a carrier secured to a non-rotatable portion of a vehicle body (not shown). The carrier 1 is provided with a pair of leg portions 3 spaced apart from each other in the rotational direction of a disc 2, secured to an axle (not shown), and straddling the disc 2. The carrier 1 is further provided with a connecting portion 4 extending between the leg portions 3 to connect them to each other on one side of the disc 2 and an outer beam 5 also extending between the leg portions 3 to connect them to each other on the other side of the disc 2. Each of the leg portions 3 is formed with a torque receiving portion 3a for slideably supporting inner and outer pads 6 and 7, respectively, in the axial direction of the disc 2 and for receiving torque from the inner and outer pads when the brake is actuated. A pair of pad springs 8 are mounted on the respective torque receiving portions 3a. Each of the pad springs 8 is disposed between the associated torque receiving portion 3a and one side edge portion of the inner and outer pads 6, 7 to protect the associated torque receiving portion 3a from being damaged. A lower end portion of each pad spring 8 abuts against the lower side edges of the inner and outer pads 6, 7 to bias them upward and outward in the radial direction of the disc 2. Reference numeral 9 designates a caliper. A pair of caliper supporting pins 10 are fixedly secured to the caliper 9. The caliper supporting pins 10 extend in the axial direction of the disc 2 and are slideably received in respective holes formed in the leg portions 3 so that the caliper 9 is supported by the carrier in a floating condition.

The caliper 9 is of a so-called fist type. The caliper 9 comprises a cylinder member 13 having a cylinder bore 12 formed therein for slideably receiving therein a piston 11 for forcing the inner pad 6 onto the disc 2. The caliper also comprises a claw member 14 including a disc-passing portion 14a extending in the axial direction of the disc 2 to straddle the disc 2 and a claw portion 14b for abutting against the outer pad 7 to force it onto the disc 2. The cylinder member 13 and claw member 14 abut against each other at respective surfaces F and F'. The cylinder bore 12 opens at the end surface F of the cylinder member 13.

For the same reason as that aforementioned in connection with the conventional caliper, the claw member 14 is made of iron, while the cylinder member 13 is made of a light alloy such as an aluminum alloy since the cylinder member 13 does need not be highly rigid, so that the caliper 9 is lighter as a whole as compared to the case wherein both members are made of iron.

Four tapped holes 15 are formed in the disk-passing portion 14a of the claw member 14 to extend in the axial direction of the disc 2, while four through-holes 16 extend in the axial direction of the disc 2 through the cylinder member 13 at positions respectively corresponding to the positions of the associated tapped holes 15. Respective tie-bolts 17 are inserted through the through-holes 16 and are threaded into the tapped holes 15. The cylinder member 13 and the claw member 14 are fixedly secured to each other by tightening the tie-bolts 17.

The claw member 14 is provided with a raised portion 18 forming a protrusion of a predetermined height at that portion of the outer or upper surface, as viewed in FIG. 1, of the disc-passing portion 14a adjacent to the end surface F'. The cylinder member 13 is also provided with a corresponding raised portion 19 forming a protrusion at that portion of the upper surface of the cylinder member adjacent the end surface F'. The protrusion formed by the raised portion 19 has substantially the same height as the raised portion 18. End faces of both raised portions 18, 19 abut against each other to prevent the claw member 14 from being deflected with respect to the cylinder member 13 in the direction designated by arrow E in FIG. 1.

Figure 2:
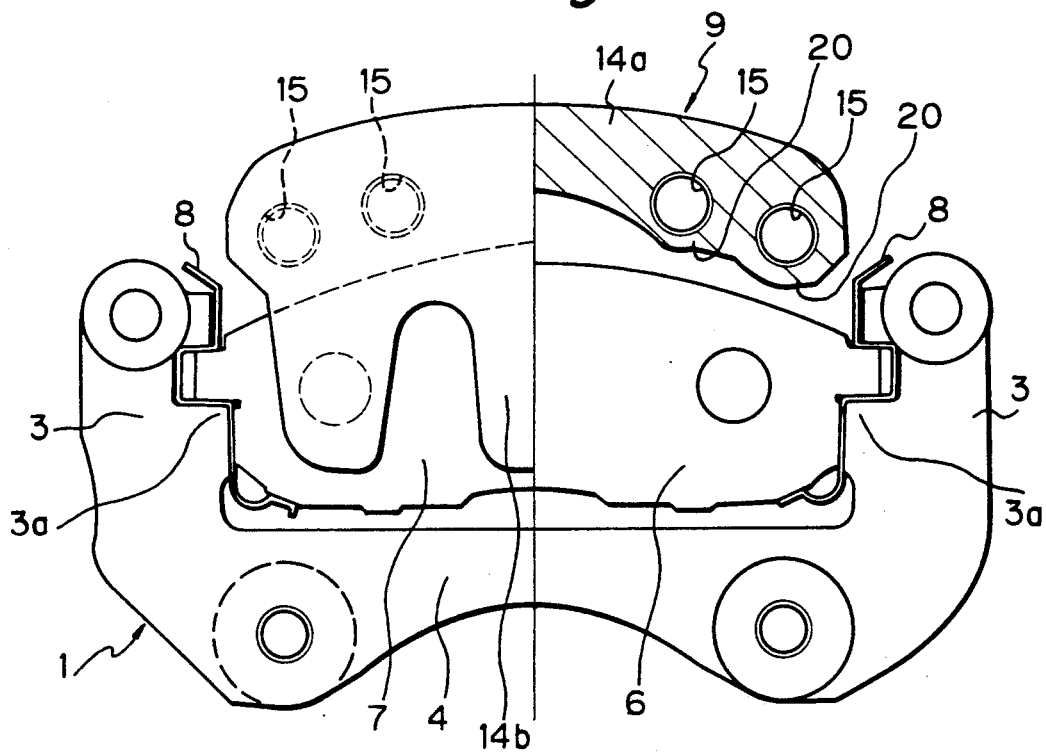
FIG. 2 shows right and left halves of the disc brake and is a combination of front and sectional views taken from line 2—2 and along line 2'—2', respectively, in FIG. 1, but omitting the disc for the sake of clarity.
Figure 3:
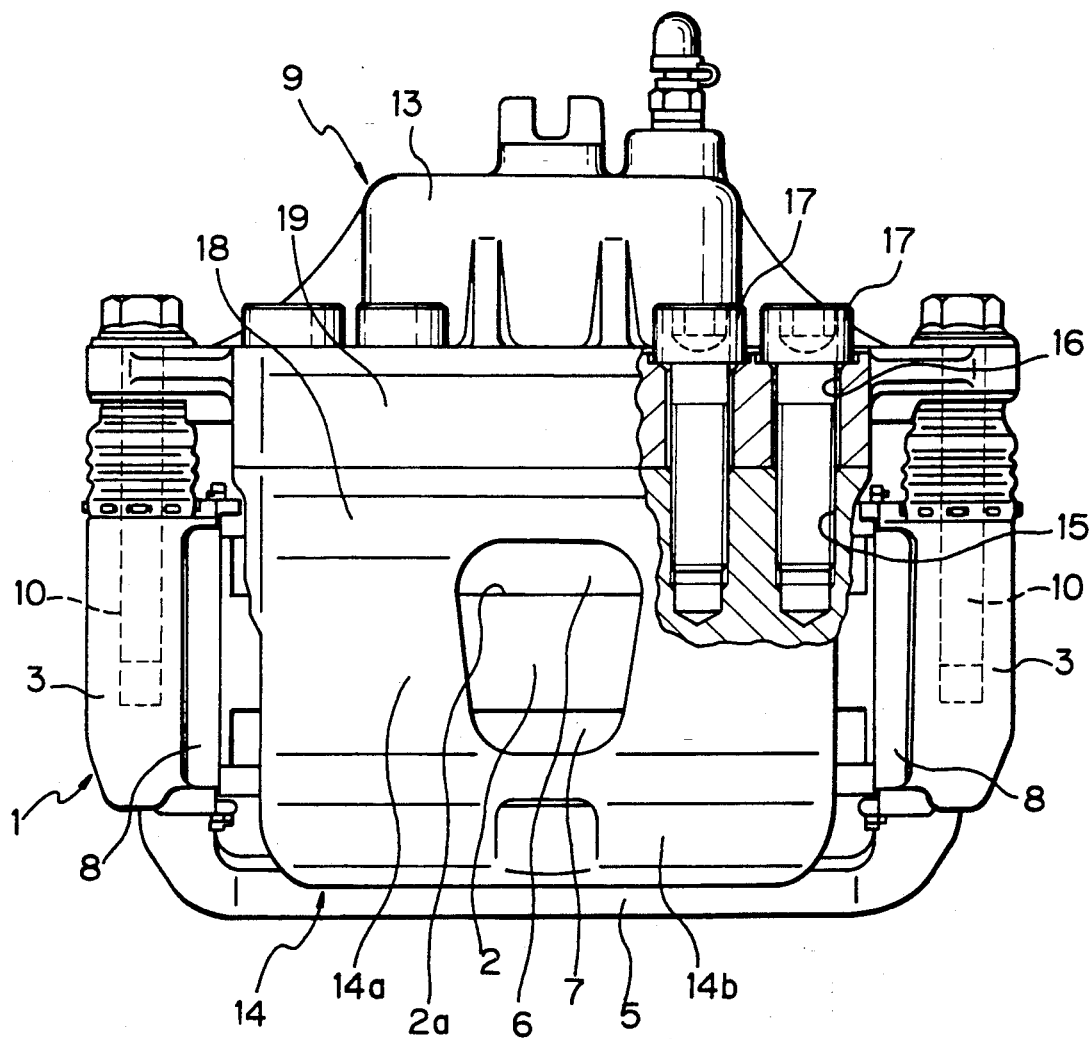
FIG. 3 is a plan view of the disc brake, partially cutaway, as taken from line 3—3 in FIG. 1.
Figure 4:
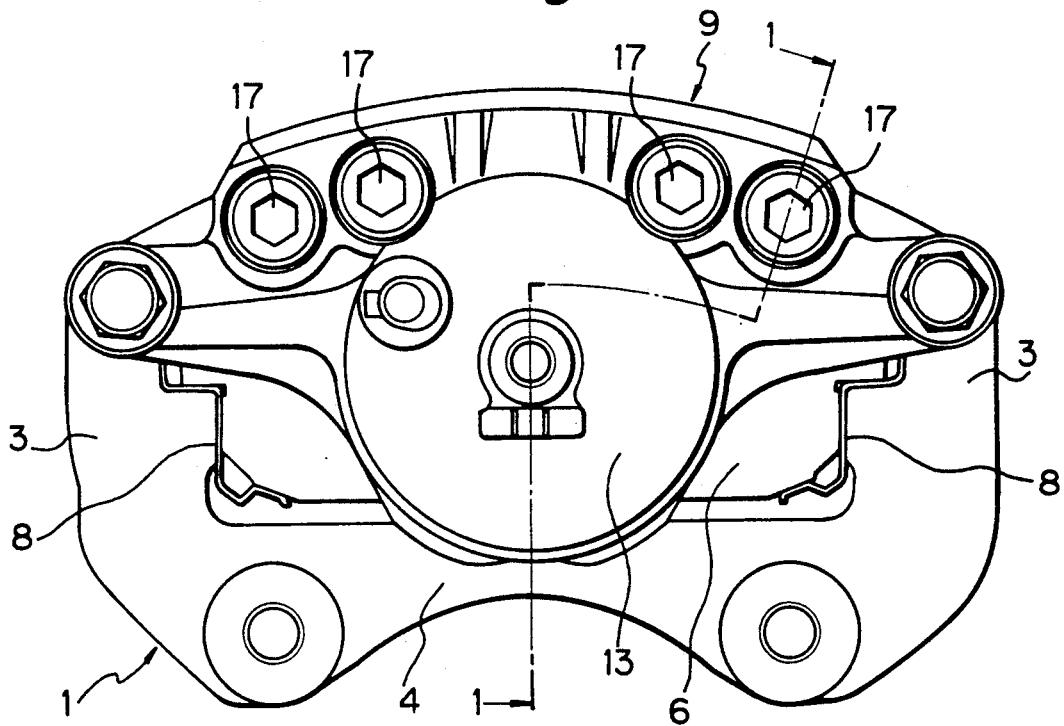
FIG. 4 is a rear view of the disc brake as taken from line 4—4 in FIG. 1.

Each of the tapped holes 15 is formed by first forming a prepared hole and then tapping a predetermined length of the prepared hole. The tapped portion has an outer diameter larger than the diameter of the remaining prepared hole portion. It should be noted that the tapped portion is formed such that the inner end of the tapped portion is located on the cylinder member side with respect to an inner braking surface 2a of the disc 2 onto which the inner pad 6 is adapted to be forced, as best shown in FIG. 1. Namely the inner end of the tapped portion is located on the right side of the plane in which the inner braking surface 2a extends as viewed in FIG. 1. Raised portions 20 are formed on the inner surface, namely on the lower surface as viewed in FIGS. 1 and 2, of the disc-passing portion 14a of the claw member 14. Each of the raised portions 20 protrudes at the lower surface of the disc-passing portion 14a over a predetermined distance and is located under the associated tapped holes 15. Each of the raised portions 20 also extends in the axial direction of the associated tapped holes 15 from the end face F to a position generally corresponding to the inner end of the tapped portion. The inner pad 6 is narrower, as viewed in the radial direction of the disc 2, than the outer pad 7 in order to avoid interference with the raised portions 20.

Although the raised portions 20 are discrete from each other in the present embodiment, a contiguous raised portion may be instead provided.

In the embodiment mentioned above, the inner pad 6 is made narrower than the outer pad in order to avoid interference with the raised portions 20. However, identical types of pads may be employed for both the inner and outer pads, and the inner pad may be located nearer to the center of the disc 2 than the outer pad in order to avoid interference with the raised portions. In that case, a decrease in the contacting area between the inner pad and the disc can be avoided.

Figure 5:
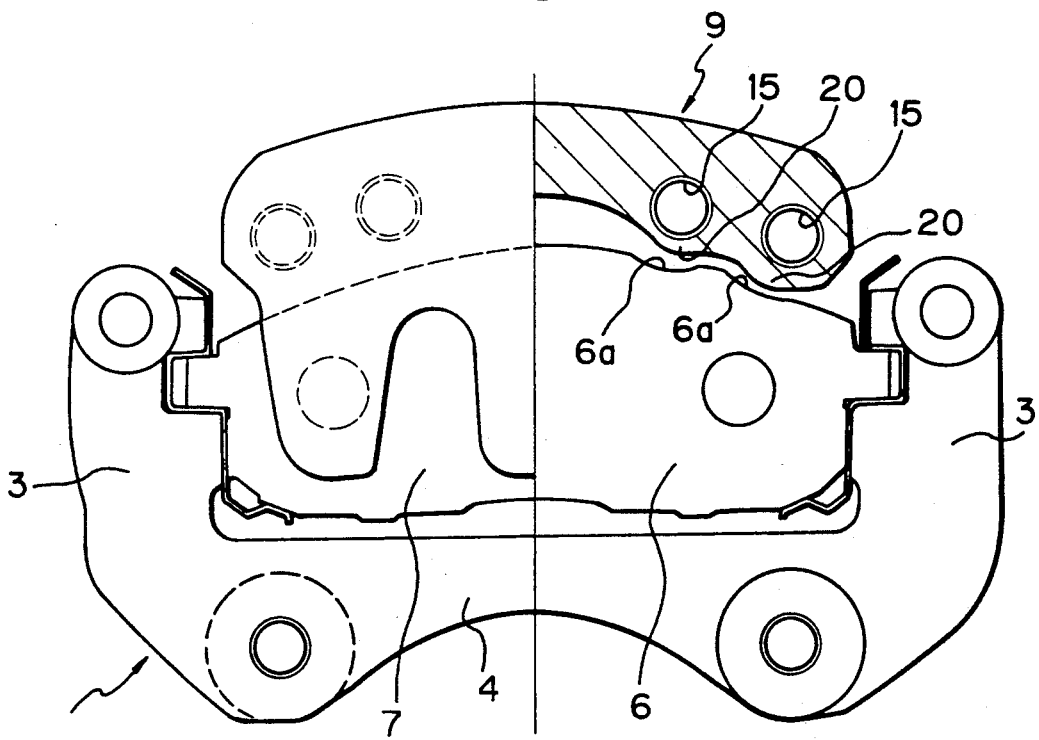
FIG. 5 is a view similar to FIG. 2 but showing an alternative embodiment of a disc brake according to the present invention.

In an alternative embodiment, an inner pad 6 may be formed with cutout portions 6a which are complementary to the respective corresponding raised portions 20 in their shape as best shown in FIG. 5. In that case, a larger contacting area is provided for the inner pad as compared to the first embodiment in which the inner pad is narrower in the radial direction of the disc.

Returning to FIG. 1, another raised portion 21 protrudes from the lower surface of the disc-passing portion 14a of the claw member 14 adjacent to the claw portion 14b to increase the rigidity of the claw member 14.

Next, the operation of the disc brake having the above-mentioned constitution will be briefly described.

When the cylinder 12 is subjected to hydraulic pressure, the piston 11 is displaced forwardly to force the inner pad 6 onto the disc 2. Since the caliper 9 is supported in a floating condition by the carrier 1 through the caliper supporting pins 10, the caliper 9 is moved in the direction opposite to the one in which the piston 11 is displaced by virtue of the reaction force transmitted from the disc 2 to the inner pad 6, and then to the piston 11, so that the claw portion 14b of the claw member 14 forces the outer pad 7 onto the disc 2. Thus, both the inner and outer pads 6, 7 are forcibly pressed onto the opposite sides of the rotating disc 2 to generate a braking force.

As explained above, the inner end of the tapped portion of the tapped hole 15 is located on the cylinder member side with respect to the inner braking surface 2a of the disc 2, and the corresponding raised portions 20 are protrude from the lower surface of the disc-passing portion 14a of the claw member, so that the strength of the connecting means, namely the tie bolts 17 can be greatly increased. As a result, distortion of the tie bolts 17 and the mating portions of the cylinder member 13 and the claw member 14 is greatly suppressed when a great force acts on the caliper 9 during a braking operation. The arrangement explained above is advantageous in that it does not involve any decrease in the radius of the disc and any increase in the number of tie-bolts for connecting the two members as compared to the conventional caliper.

As many apparently widely different embodiments of this invention may be made without departing from the spirit and scope thereof, it is to be understood that the invention is not limited to the specific embodiments thereof except as defined in the appended claims.

What is claimed is:

1. A disc brake of an automotive vehicle, said disc brake comprising:

a carrier fixedly secured to a non-rotatable portion of a body of the vehicle;

a rotating disc having inner and outer braking surfaces;

an inner pad facing said inner braking surface and an outer pad facing said outer braking surface, said inner and outer pads being supported for sliding movement in the axial direction of said disc by said carrier so as to be engageable with said inner and outer braking surfaces of the disc; and a caliper supported in a floating condition by said carrier, said caliper including a cylinder member housing therein a piston for forcing said inner pad onto said inner braking surface of the disc, a claw member having both a disc-passing portion straddling said disc and said pads and a claw portion for abutting against the outer pad to force it onto the outer braking surface of said disc, said cylinder member having a through-hole extending therethrough in the axial direction of said disc, said disc-passing portion of the claw member having an inner surface facing the radially outermost peripheral surfaces of said disc and said pads, said disc-passing portion of the claw member defining a hole extending therein in the axial direction of the disc and which hole has a female-tapped portion, and a bolt member extending through said through-hole of the cylinder member and threaded into the female-tapped portion of said hole so as to fixedly secure said cylinder member and said claw member to each other, said female-tapped portion having an end thereof which is remote from said cylinder member and which end terminates short of a plane extending radially of said disc coincident with said inner braking surface thereof, said disc-passing portion having a protrusion at said inner surface thereof extending toward the radially outermost peripheral surface of said inner pad in the vicinity of at least the female-tapped portion of the hole, said protrusion also extending in the axial direction of said disc to generally the same extent as does said female-tapped portion, and the radially outermost peripheral surface of said inner pad being located inwardly of that of the outer pad in the radial direction of said disc, at least in the vicinity of said protrusion, so that clearance is left between said disc-passing portion and said inner pad.

2. A disc brake according to claim 1, wherein said outermost peripheral surface is recessed in the vicinity of said protrusion so as to provide said clearance.

* * * * *